Oct. 13, 1925.
H. C. REES
OPTICAL INSTRUMENT
Filed Nov. 9, 1921
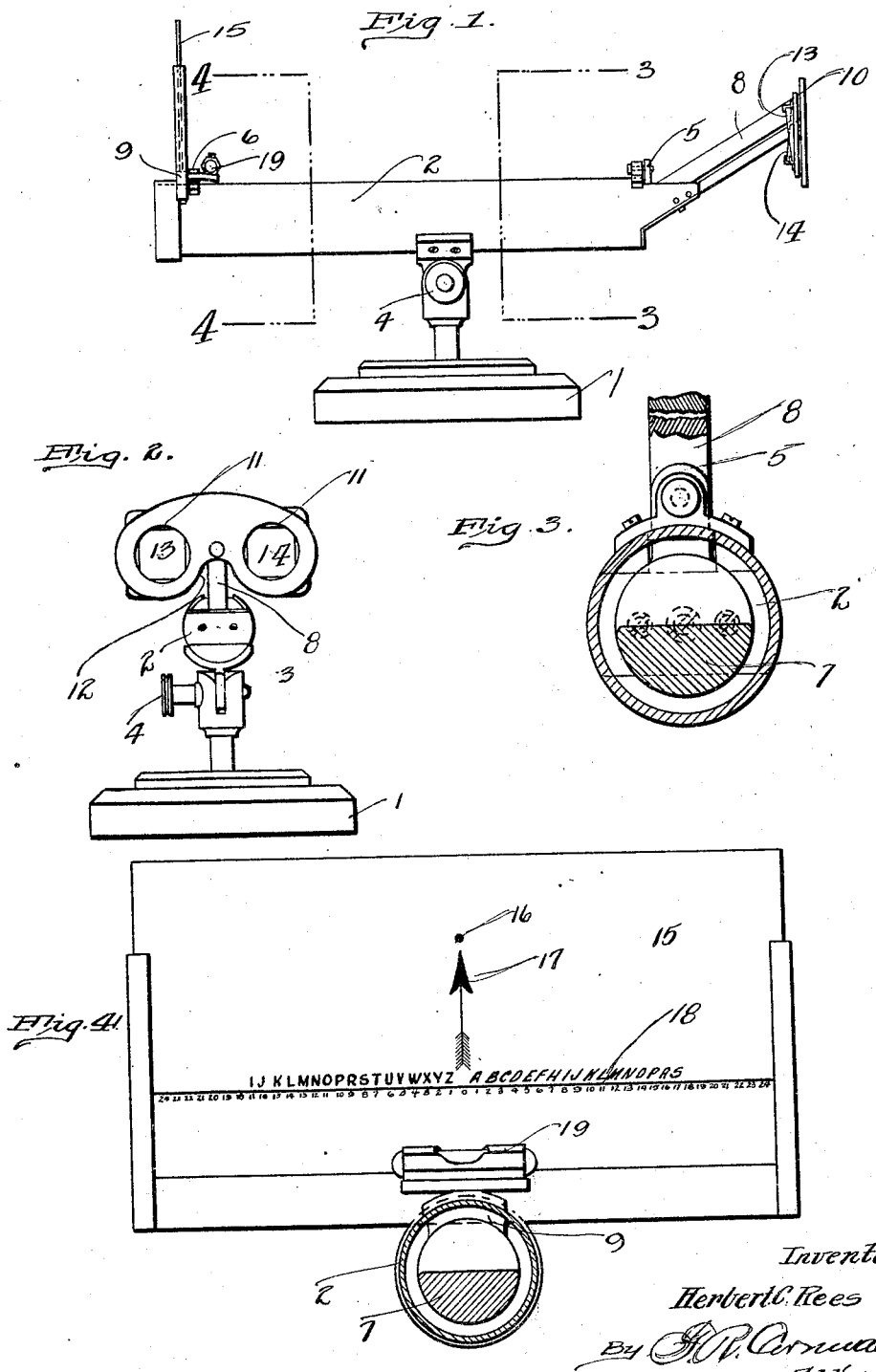
Inventor
Herbert C. Rees
By J. P. Cornwall
Atty Patented Oct. 13, 1925.

1,557,328

UNITED STATES PATENT OFFICE.

HERBERT C. REES, OF SAN ANTONIO, TEXAS.

OPTICAL INSTRUMENT.

Application filed November 9, 1921. Serial No. 513,875.

*To all whom it may concern:*

Be it known that I, HERBERT C. REES, a citizen of the United States, residing at San Antonio, county of Bexar, and State of Texas, have invented a certain new and useful Improvement in Optical Instruments, of which the following is a full, clear, and exact description, such as will enable others skilled in the art to which it appertains, to make and use the same, reference being had to the accompanying drawings, forming part of this application.

My invention relates to optical instruments used for testing the accommodative convergence of the eye muscles and consists in a binocular phorometer in which the efficiency of the instrument is maintained uniformly by preserving a constant relation between the instrument and the eyes and the horizontal.

When the eyes are directed at an object, they accommodate and bring about an associated amount of convergence, to an extent depending upon the distance of the object viewed.

When the eyes are functioning under normal conditions, there is a constant comfortable enervation supplying both the accommodative and converging muscles, but this normal condition which is termed orthophoria may be effected by defective eyesight or other abnormal physiological conditions.

When the eyes are focused at the "near point" under non-orthophoric conditions, they are subjected to strain and the main object of my invention is to provide a device which will test the accommodative convergence of the eyes and detect a non-orthophoric condition and to practically indicate the extent thereof.

When the eyes are reading or doing other close work they normally lie in a horizontal plane. In testing the eyes, any departure from the horizontal of the same or of a chart with which they are being tested affects the value of the test and it is an object of my invention to automatically secure horizontal positioning of the eyes and of all of the parts of the instrument. So far as I am aware, the securing of this result heretofore has been left to the knowledge, skill and attention of the person employing the instrument.

In the accompanying drawings, which illustrate a selected embodiment of my invention—

Figure 1 is a side view of the device.

Figure 2 is an end view looking towards the right.

Figure 3 is a vertical transverse section on line 3—3 of Figure 1.

Figure 4 is a vertical transverse section on the line 4—4 of Figure 1.

Tiltably mounted on the base 1 of my device is a longitudinal support member 2 which I have shown as a cylindrical shell adjustable on the base by means of a pin 3 and an adjusting screw 4. Suspended from pivotal mountings 5 and 6 on support 2 is a longitudinal element 7 extending substantially throughout the length of shell 2 and preferably made of a heavy material and in such form and size that the weight of the element will cause same to swing in shell 2 to a vertical position independently of the inclination of member 2 transversely of its longitudinal axis. Extending upwardly from each end of element 7 through suitable openings in shell 2 are holders 8 and 9, respectively.

Holder 8 carries a plate 10 having openings 11 and a recess 12 which adapts the plate to be fitted to the human face. Mounted on plate 8 in front of openings 11 is a pair of prisms 13 and 14, one of which is arranged with its base up and the other with its base down; such a prism arrangement being a common device for creating double images.

Holder 9 mounts a chart 15 which extends transversely of the longitudinal axis of member 2 and carries suitable indicia which I have here shown as a red dot 16, a black arrow 17, and a horizontal black line 18 below said arrow and dot, with a series of letters and numbers arranged along the line for the purpose of enabling the patient to describe the relative position of the double images created by the prisms 13 and 14.

The degree of refraction of prisms 13 and 14 is such that at the distance between same and chart 15 the departure of the refracted rays from each other vertically will equal the distance between dot 16 and line 18. The prisms should be of such degree that the lower part of the arrow 17 in the upper image is always in the fusion field of the top of the arrow in the lower image; this latter distance will not be so great as to suppress the desire for single vision which exists whenever the eyes view two similar objects near each other.

A phenomenon existing when a double image is created in front of the eyes in a manner similar to that described above, is that the eyes will not align the images vertically but will offset them transversely. With four to six prism dioptres, a distance between prism and chart of forty (40) cm. and a distance between dot 16 and line 18 of forty-eight millimeters, the amount of vertical displacement with normal eyesight should equal the distance between the dot and the line, and the above mentioned transverse offset should be from four to six prism dioptres to the right. (Physiologic exophoria.)

Upon viewing the chart through these lenses, if the red dot appears above or below the line, there is a condition of hyperphoria, and if the transverse location of the dot be to the right or left of the area indicated, there is a condition of exophoria or esophoria, respectively. If any of these conditions exist, instead of the normal orthophoria, it is instantly indicated and according to the departure of the dot, as seen by the patient, from the proper area, the extent of the physiological defect may be judged.

A level 19 disposed transversely of member 2 and mounted upon holder 9 affords a convenient but not essential means for indicating whether or not the leveling feature of the instrument is functioning and also, by tilting the chart during a test, for indicating the degree of hyperphoria.

In the use of a device of the nature of the above described instrument, it may be set upon a table, a stand, or may be mounted upon a swinging bracket or otherwise supported, and in any of these events, an accurate leveling of the instrument is unlikely to be obtained. This, however, will be immaterial because of the self-leveling arrangement provided by the suspended weight element for the prisms and chart are rigidly united thereby. The transverse line of the chart and the line intersecting the centers of openings 11 will always be horizontal to the longitudinal axis of member 2, although the pivotal mounting of the member on base 1 permits the prisms and the chart to assume different heights.

Parallelism of plate 10 and chart 15 is also maintained although the inclination of the plate and chart will vary with the tilting of member 2. This tilting is provided for the purpose of adjusting the instrument to the height of the patient and also for obtaining the downwardly inclined line of vision which normally exists in reading or working.

By means of my instrument, the eyes may be tested when they are in a state of activity rather than when practically quiescent or relaxed as would be the case of the object viewed were some twenty feet away or at a still greater distance.

I contemplate the usual modifications in the details of my device, without departing from the spirit of the invention as set forth in the following claims.

I claim:

1. In an optical instrument, a sighting device pivoted to swing transversely of its axis, a chart target rigidly associated therewith, and means for automatically leveling said device and target at right angles to the axis of the sighting device.

2. In an optical instrument, a sighting device adjustable in the vertical plane of its axis and tiltable transversely of its axis, a chart target rigidly associated therewith, and means for automatically leveling said device and target at right angles to the axis of the sighting device and independently of its adjustment in the vertical plane of its axis.

3. In an optical instrument, a pair of prisms and a chart rigidly mounted in relation to each other, and means for automatically leveling said prisms and chart.

4. An optical instrument comprising a longitudinal support member, a pair of prisms and a chart rigidly attached to said support member, and means for automatically leveling said support member at right angles to its axis.

5. In an optical instrument, a support, a prism holder, a chart holder spaced therefrom, said holders being pivotally mounted on said support, and means for automatically leveling said holders.

6. In an optical instrument, a support, a prism holder, a chart holder spaced therefrom, said holders being pivotally mounted on said support and rigidly united, and means for automatically leveling said holders.

7. In an optical instrument, a pair of prisms pivotally mounted, a chart spaced from said prisms and pivotally mounted, and weight means attached to said prisms and chart tending to maintain same in a predetermined relation to the horizontal.

8. In an optical instrument, a longitudinal frame, a longitudinal member pivotally suspended from said frame, upwardly extending elements adjacent to the ends of said member, a pair of vision members mounted on the upper portion of one of said elements, and an indicating chart device mounted on the upper portion of the other of said elements.

9. In an optical instrument, a longitudinal casing, a longitudinal member in said casing pivotally suspended from the top thereof, a prism and a chart mounted at spaced intervals on said member and held thereby so as to provide an uninterrupted line of vision between said prism and chart.

10. In an optical instrument, a base, a longitudinal casing pivoted thereon to tilt in a vertical plane, a rigid element suspended from said casing carrying eye testing apparatus and adapted to maintain respective elements of said apparatus in predetermined relation to the horizontal independently of the inclination of said base and the tilting of said element.

11. In an instrument for testing the accommodative convergence of the eyes, a pair of lenses, a chart target, means for inclining the lenses and target to provide normal reading position of the eyes being tested, and means for automatically maintaining the target in predetermined relation to the horizontal independently of the inclination of the lenses and said first mentioned means.

12. An instrument for determining the accommodation of the eye muscles by measuring the convergence of the eyes under normal working conditions, comprising a prism arrangement for producing double images, and a chart to be viewed therethrough to measure any departure from the normal in the relative positions of said images, and means for automatically leveling said prism arrangement and chart.

13. An instrument for determining the accommodation of the eye muscles by measuring the convergence of the eyes under normal working conditions, comprising a prism arrangement for producing double images, and a chart to be viewed through said arrangement, means for tilting the instrument longitudinally of the line of vision, and means for automatically leveling the instrument transversely of the line of vision.

14. An instrument for indicating a non-orthophoric state of the eyes including a pair of prisms for producing double images under normal reading conditions of the eyes and a chart in rigid relation therewith for indicating the relation of said images to each other, and automatic leveling means for said prisms and chart.

15. An optical instrument for determining excessive or insufficient accommodative convergence effort at the near point, comprising means for creating double images without suppressing the desire for single vision, and means for simultaneously indicating the distance between the double images and their direction from each other.

16. A device for determining non-orthophoric conditions comprising a pair of prisms, arranged base up and base down respectively, and a chart arranged before said prisms bearing a horizontal line and a dot of a different color spaced above said line.

17. A device for determining non-orthophoric conditions comprising a pair of prisms, arranged base up and base down respectively, a chart arranged in front of said prisms, a horizontal divided line on said chart, a dot on said chart spaced above said line, the refractive index of said prisms and the distance between them and said chart being such that with normal eyesight, one image of said dot produced by said prisms will be superimposed on said line at a predetermined point thereon.

In testimony whereof I hereunto affix my signature this 3rd day of November, 1921.

HERBERT C. REES.